United States Patent [19]

Corbett et al.

[11] Patent Number: 4,905,175
[45] Date of Patent: Feb. 27, 1990

[54] DIGIT-SERIAL SHIFTERS CONSTRUCTED FROM BASIC CELLS

[75] Inventors: Peter F. Corbett, Princeton, N.J.; Richard I. Hartley, Schenectady, N.Y.

[73] Assignee: General Electric Company, Schenectady, N.Y.

[21] Appl. No.: 280,070

[22] Filed: Dec. 5, 1988

[51] Int. Cl.[4] ............................................. G06F 7/38
[52] U.S. Cl. ............................................. 364/715.08
[58] Field of Search ..................... 364/715.08, 715.01

[56] References Cited

U.S. PATENT DOCUMENTS 4,383,304  5/1983  Hirashima ..................... 364/715.08
4,472,788  9/1984  Yamazaki ...................... 364/715.08

*Primary Examiner*—Gary V. Harkcom
*Assistant Examiner*—Long T. Nguyen

*Attorney, Agent, or Firm*—Allen L. Limberg; James C. Davis, Jr.; Marvin Snyder

[57] ABSTRACT

A data shifter is constructed in monolithic integrated-circuit form essentially from three basic cells, namely: a first or A type of bit-slice cell with a multiplexer for selecting one of two inputs to a clocked output latch, a second or B type of bit-slice cell with a multiplexer for selecting one of two inputs to a cascaded pair of clocked latches, and a control cell for controlling the selection process in bit-slice cells arranged in a stack therewith. In addition where the order of the bits in each successive digit of the shifter output needs to be rotated, this can be accomplished using combinations of two further types of basic cells, namely: a braid-slice cell, and a braid-cap cell. These cells are rectangular and tile in a close-packed mosaic. The disclosure describes how to make a same set of basic cells that is adaptable for use both in left shifters and in right shifters.

20 Claims, 10 Drawing Sheets

| INPUT | SHIFTS OF A 12b WORD, 3 × 4b DIGITS | | | | | |
|---|---|---|---|---|---|---|
| OUTPUT FOR: | $a_8 a_9 a_{10} a_{11}$, | $b_0 b_1 b_2 b_3$ | $b_4 b_5 b_6 b_7$ | $b_8 b_9 b_{10} b_{11}$, | $c_0 c_1 c_2 c_3$ | |
| SHIFT RIGHT 1 | $a_5 a_6 a_7 a_8$ | $a_9 a_{10} a_{11} a_{11}$, | $b_1 b_2 b_3 b_4$ | $b_5 b_6 b_7 b_8$ | $b_9 b_{10} b_{11} b_{11}$, | |
| SHIFT RIGHT 2 | $a_6 a_7 a_8 a_9$ | $a_{10} a_{11} a_{11} a_{11}$, | $b_2 b_3 b_4 b_5$ | $b_6 b_7 b_8 b_9$ | $b_{10} b_{11} b_{11} b_{11}$, | |
| SHIFT RIGHT 5 | $a_5 a_6 a_7 a_8$ | $a_9 a_{10} a_{11} a_{11}$, | $a_{11} a_{11} a_{11} a_{11}$, | $b_5 b_6 b_7 b_8$ | $b_9 b_{10} b_{11} b_{11}$, | |
| SHIFT RIGHT 4 | $a_8 a_9 a_{10} a_{11}$ | $a_{11} a_{11} a_{11} a_{11}$, | $b_4 b_5 b_6 b_7$ | $b_8 b_9 b_{10} b_{11}$ | $b_{11} b_{11} b_{11} b_{11}$, | |
| SHIFT RIGHT 6 | $a_6 a_7 a_8 a_9$ | $a_{10} a_{11} a_{11} a_{11}$ | $a_{11} a_{11} a_{11} a_{11}$, | $b_6 b_7 b_8 b_9$ | $b_{10} b_{11} b_{11} b_{11}$, | |
| SHIFT RIGHT 8 | $a_8 a_9 a_{10} a_{11}$ | $a_{11} a_{11} a_{11} a_{11}$ | $a_{11} a_{11} a_{11} a_{11}$, | $b_8 b_9 b_{10} b_{11}$ | $b_{11} b_{11} b_{11} b_{11}$, | |
| SHIFT RIGHT 9 | $x_{11} x_{11} x_{11} x_{11}$, | $a_9 a_{10} a_{11} a_{11}$ | $a_{11} a_{11} a_{11} a_{11}$, | $a_{11} a_{11} a_{11} a_{11}$, | $b_9 b_{10} b_{11} b_{11}$, | |
| SHIFT RIGHT 10 | $x_{11} x_{11} x_{11} x_{11}$, | $a_{10} a_{11} a_{11} a_{11}$ | $a_{11} a_{11} a_{11} a_{11}$, | $b_7 b_8 b_9 b_{10}$, | $b_{10} b_{11} b_{11} b_{11}$, | |
| SHIFT LEFT 1 | $a_7 a_8 a_9 a_{10}$, | 0 0 $b_0 b_1$ | $b_3 b_4 b_5 b_6$ | $b_7 b_8 b_9 b_{10}$, | 0 $c_0 c_1 c_2$ | |
| SHIFT LEFT 2 | $a_6 a_7 a_8 a_9$, | 0 0 $b_0 b_1$ | $b_2 b_3 b_4 b_5$ | $b_6 b_7 b_8 b_9$, | 0 0 $c_0 c_1$ | |
| SHIFT LEFT 4 | 0 0 0 0 | 0 $b_0 b_1 b_2 b_3$ | $b_4 b_5 b_6 b_7$, | 0 0 0 0 | $c_0 c_1 c_2 c_3$ | |
| SHIFT LEFT 5 | 0 0 0 0 | 0 0 $b_0 b_1 b_2$ | $b_3 b_4 b_5 b_6$, | 0 0 0 0 | 0 $c_0 c_1 c_2$ | |
| SHIFT LEFT 6 | 0 0 0 0 | 0 0 $b_0 b_1$ | $b_2 b_3 b_4 b_5$, | 0 0 0 0 | 0 0 $c_0 c_1$ | |
| SHIFT LEFT 8 | 0 0 0 0 | 0 $b_0 b_1 b_2 b_3$, | 0 0 0 0 | 0 0 0 0 | $c_0 c_1 c_2 c_3$, | |
| SHIFT LEFT 9 | 0 0 0 0 | 0 0 $b_0 b_1 b_2$, | 0 0 0 0 | 0 0 0 0 | 0 $c_0 c_1 c_2$, | |
| SHIFT LEFT 10 | 0 0 0 0 | 0 0 $b_0 b_1$, | 0 0 0 0 | 0 0 0 0 | 0 0 $c_0 c_1$, | |

COMMAS DENOTE WORD BOUNDARIES

FIG. 1

| INPUT | UNROTATED SHIFTS OF A 12b WORD, 3 x 4b DIGITS | | | | | BITSLICES | | | |
|---|---|---|---|---|---|---|---|---|---|
| | $a_8 a_9 a_{10} a_{11},$ | $b_0 b_1 b_2 b_3$ | $b_4 b_5 b_6 b_7$ | $b_8 b_9 b_{10} b_{11},$ | $c_0 c_1 c_2 c_3$ | | | | |
| OUTPUT FOR: | | | | | | | | | |
| SHIFT RIGHT 1 | $a_8 a_5 a_6 a_7$ | $a_{11} a_9 a_{10} a_{11},$ | $b_4 b_1 b_2 b_3$ | $b_8 b_5 b_6 b_7$ | $b_{11} b_9 b_{10} b_{11},$ | A | B | B | B |
| SHIFT RIGHT 2 | $a_8 a_9 a_6 a_7$ | $a_{11} a_{11} a_{10} a_{11},$ | $b_4 b_5 b_2 b_3$ | $b_8 b_9 b_6 b_7$ | $b_{11} b_{11} b_{10} b_{11},$ | A | A | B | B |
| SHIFT RIGHT 4 | $a_8 a_9 a_{10} a_{11}$ | $a_{11} a_9 a_{10} a_{11}$ | $b_4 b_5 b_6 b_7$ | $b_8 b_9 b_{10} b_{11}$ | $b_{11} b_{11} b_{11} b_{11},$ | A | A | A | B |
| SHIFT RIGHT 5 | $a_8 a_5 a_6 a_7$ | $a_{11} a_9 a_{10} a_{11}$ | $b_4 b_5 b_6 b_7$ | $b_8 b_6 b_6 b_7$ | $b_{11} b_9 b_{10} b_{11}$ | A | B | A | B |
| SHIFT RIGHT 6 | $a_8 a_9 a_6 a_7$ | $a_{11} a_{11} a_{10} a_{11}$ | $b_4 b_5 b_2 b_3$ | $b_8 b_9 b_6 b_7$ | $b_{11} b_{11} b_{10} b_{11}$ | A | A | B | B |
| SHIFT RIGHT 8 | $a_8 a_9 a_{10} a_{11}$ | $a_{11} a_{11} a_{11} a_{11}$ | $a_{11} a_{11} a_{11} a_{11},$ | $b_8 b_9 b_{10} b_{11}$ | $b_{11} b_{11} b_{11} b_{11}$ | A | A | A | B |
| SHIFT RIGHT 9 | $x_{11} x_{11} x_{11} x_{11},$ | $a_{11} a_{11} a_{10} a_{11}$ | $a_{11} a_{11} a_{11} a_{11},$ | $a_{11} a_{11} a_{11} a_{11},$ | $b_{11} b_{11} b_{11} b_{11}$ | A | B | A | A |
| SHIFT RIGHT 10 | $x_{11} x_{11} x_{11} x_{11},$ | $a_{11} a_{11} a_{10} a_{11}$ | $a_{11} a_{11} a_{11} a_{11}$ | $b_8 b_9 b_{10} b_7,$ | $b_{11} b_{11} b_{10} b_{11},$ | A | A | A | B |
| SHIFT LEFT 1 | $a_8 a_9 a_{10} a_7,$ | $b_0 b_1 b_2 0$ | $b_4 b_5 b_6 b_3$ | $b_8 b_9 b_{10} b_7,$ | $c_0 c_1 c_2 0$ | A | A | A | B |
| SHIFT LEFT 2 | $a_8 a_9 a_6 a_7,$ | $b_0 b_1 0 0$ | $b_4 b_5 b_2 b_3$ | $b_8 b_9 b_6 b_7,$ | $c_0 c_1 c_2 c_3$ | A | A | A | A |
| SHIFT LEFT 4 | 0 0 0 0 | $b_0 b_1 b_2 b_3$ | $b_4 b_5 b_6 b_7,$ | 0 0 0 0 | $c_0 c_1 c_2 0$ | A | A | A | B |
| SHIFT LEFT 5 | 0 0 0 0 | $b_0 b_1 0 2 0$ | $b_4 b_5 b_6 b_3,$ | 0 0 0 0 | $c_0 c_1 c_2 0$ | A | A | A | B |
| SHIFT LEFT 6 | 0 0 0 0, | $b_0 b_1 0 0$ | $b_4 b_5 b_2 b_3$ | 0 0 0 0, | $c_0 c_1 0 0$ | A | A | A | A |
| SHIFT LEFT 8 | 0 0 0 0, | $b_0 b_1 b_2 b_3,$ | 0 0 0 0 | 0 0 0 0, | $c_0 c_1 c_2 c_3,$ | A | A | A | A |
| SHIFT LEFT 9 | 0 0 0 0 | $b_0 b_1 b_2 0,$ | 0 0 0 0 | 0 0 0 0 | $c_0 c_1 c_2 0,$ | A | A | A | B |
| SHIFT LEFT 10 | 0 0 0 0 | $b_0 b_1 0 0,$ | 0 0 0 0 | 0 0 0 0 | $c_0 c_1 0 0,$ | A | A | A | B |

COMMAS DENOTE WORD BOUNDARIES

FIG. 2

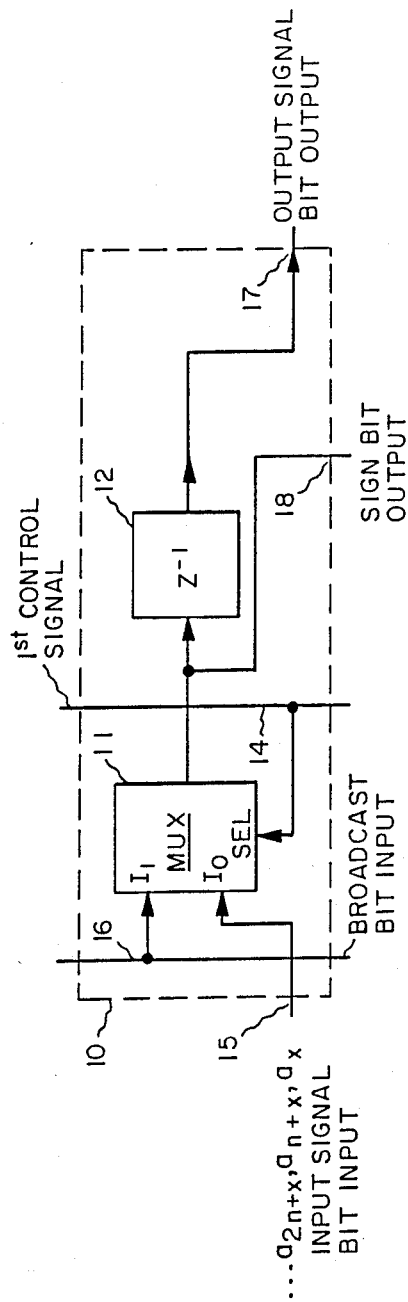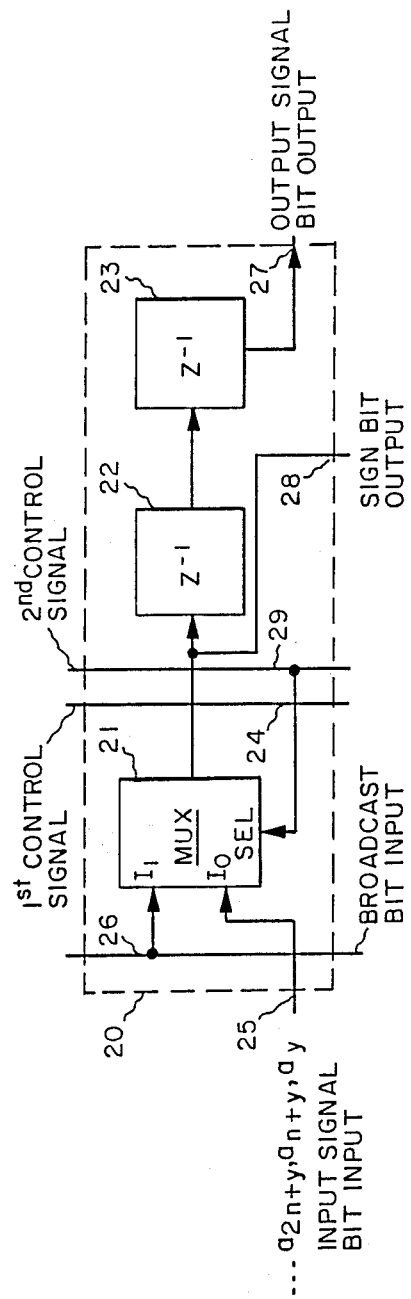
FIG. 3
FIG. 4

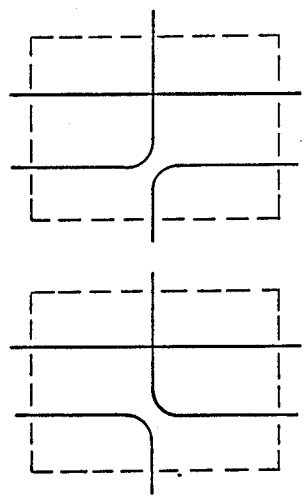
Fig. 13
Fig. 12
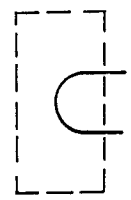
Fig. 14
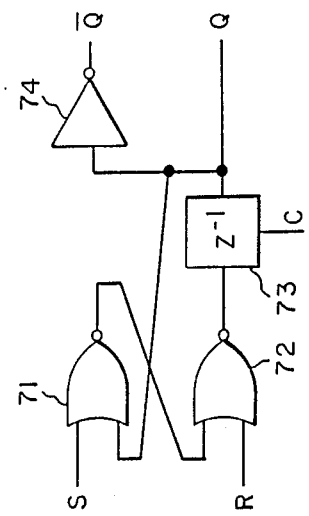
Fig. 5a
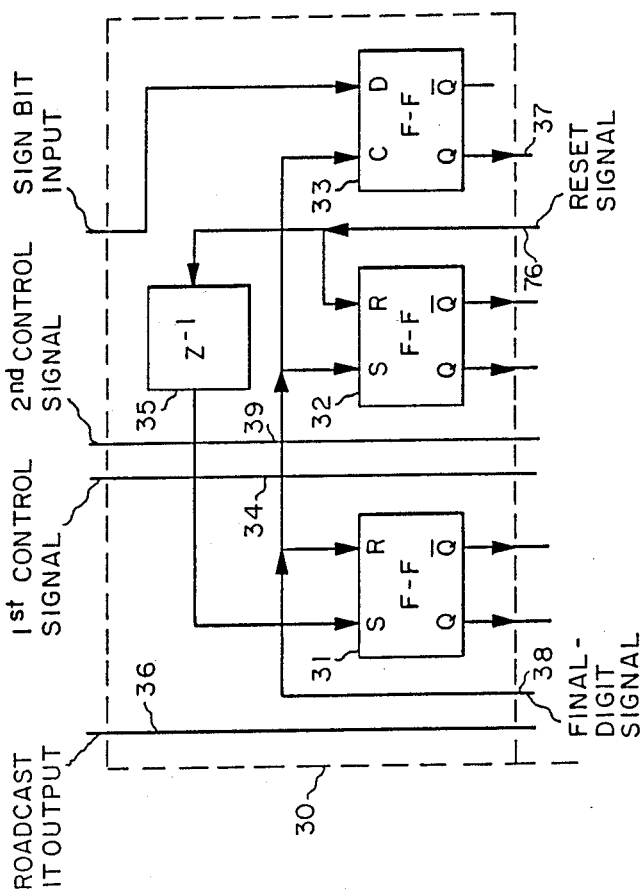
Fig. 5

DIGIT-SERIAL SHIFTERS CONSTRUCTED FROM BASIC CELLS

The present invention relates to shifters for digital data and, more particularly, to shifters for shifting digit-serial data either left or right, but constructed in monolithic-integrated circuit form in accordance with a small set of basic "building-block" cells as can be readily stored in a silicon compiler library.

BACKGROUND OF THE INVENTION

Shifts of digital data representing binary numbers towards increased significance or towards decreased significance are regarded as shifts left or as shifts right, respectively, in the more commonly used convention for arithmetic processing. Binary- place shifts are commonly encountered in multiplication, division, the taking of roots by synthetic division, and other arithmetic procedures.

Digit-serial arithmetic procedures share some of the attributes of the more common procedures employing serial (or bit-serial) arithmetic and employing parallel arithmetic. Each arithmetic word is divided into digits each of a few bits—e.g. three, four, five or six bits per digit. The bits within each digit are processed in parallel with each other, but the digits are processed serially respective to each other. The serial processing is done beginning with the least significant bit, and the digits are also supplied in order of increasing significance. Digit-serial arithmetic allows the use of simpler digital hardware than parallel arithmetic, approaching the simplicity of that for bit-serial arithmetic. At the same time, the parallel processing of each digit speeds processing and reduces the latency (delay) in processing. So, often the most favorable trade-off of speed versus digital hardware requirements is found using digit-serial arithmetic.

In more recent times most digital arithmetic circuitry is constructed in monolithic integrated circuit form and indeed in very large scale integrated (VLSI) circuit form. The layout of individual circuits on the monolithic die is an onerous task to do "by hand" in a VLSI circuit, so the task is performed by machine using an apparatus generally known as a "silicon compiler". The compiler is a computer containing within its memory a library of elemental circuit structures that are used as "building blocks" to be combined according to instructions from a human operator to form complex circuit structures. These elemental circuit structures repose within respective basic cells or tiles of standard dimensions that can be arranged in a more or less regular mosaic to form the more complex circuitry.

Generally, the basic cells are rectangular. Rectangular shapes lend themselves to close-packed tiling without intervening spaces and fit well within the rectangular boundaries of the monolithic die. Also rectangular cells can be readily laid out with a perversion, an inversion or both on the surface of the die.

The practical problem one encounters with more straightforward shifter designs is that they do not lend themselves to dissection into a restricted number of basic cells. This is in part because left shifters and right shifters tend not to use the same basic cells. In large measure, however, the problem with reducing the number of basic cells comes about because of the n respective bits in each digit being processed in respective pipeline structures. The n pipeline structures resist being tiled alike, because interconnections to load the successive stages in each of these pipeline structures are dissimilar. Accordingly, there is a strong tendency towards an undesirable n-fold increase in the number of basic cells associated with digit-serial processing, and there are attendant problems arriving at an architecture in which the basic cells can be arranged in a compact stack of bit-slice cells that lends itself to being in close cascade connection with other portions of a monolithic integrated circuit.

There is an underlying desire in regard to the invention to tile the n pipelines involved in a digit-serial shifter using the same set of basic cells for each pipeline, rather than n sets of basic cells one for each pipeline.

SUMMARY OF THE INVENTION

The invention is embodied in a data shifter adapted to be constructed in monolithic integrated-circuit form essentially from three basic cells, namely:

a first or A type of bit-slice cell with a multiplexer for selecting one of two inputs to a clocked output latch, a second or B type of bit-slice cell with a multiplexer for selecting one of two inputs to a cascaded pair of clocked latches, and a control cell for controlling the selection process in bit-slice cells arranged in a stack therewith.

In addition where the order of the bits in each successive digit of the shifter output needs to be barrel shifted, this can be accomplished using combinations of two further types of basic cell, namely:

a braid-slice cell, and a braid-cap cell.

These cells are rectangular and tile in a close-packed mosaic.

In preferred embodiments of the invention the same set of basic cells is adaptable for use both in left shifters and in right shifters.

BRIEF DESCRIPTION OF THE DRAWING

FIG. 1 is a table of illustrative shifts of a twelve-bit word composed of three four-bit digits, from which barrel shifts within digits may be discerned.

FIG. 2 is a table of the same shifts of a twelve-bit word composed of three four-bit digits, but where the rotations of the bits within digits that normally are associated with a shift are not made.

FIG. 3 is a schematic diagram of a first (or A) type of bit-slice cell, which is one of the set of basic cells from which shifters embodying the invention are constructed.

FIG. 4 is a schematic diagram of a second (or B) type of bit-slice cell, which is another of the set of basic cells, from which shifters embodying the invention are constructed.

FIG. 5 is a schematic diagram of a control cell, which is a still further one of the set of basic cells from which shifters embodying the invention are constructed.

FIG. 5a is a schematic diagram of the particular form the SR flip-flops FIG. 5 take.

FIG. 12 and FIG. 13 are schematic diagrams of alternative types of braid-slice cells.

FIG. 14 is a schematic diagram of a braid-cap cell which is combined with braid-slice cells of the sort shown in FIG. 12 or 13 in various combinations, for barrel shifting output bit order within digits in shifters that embody the invention and provide shifts by numbers of bits that are not multiples of the numbers of bits per digit.

Figure 6:
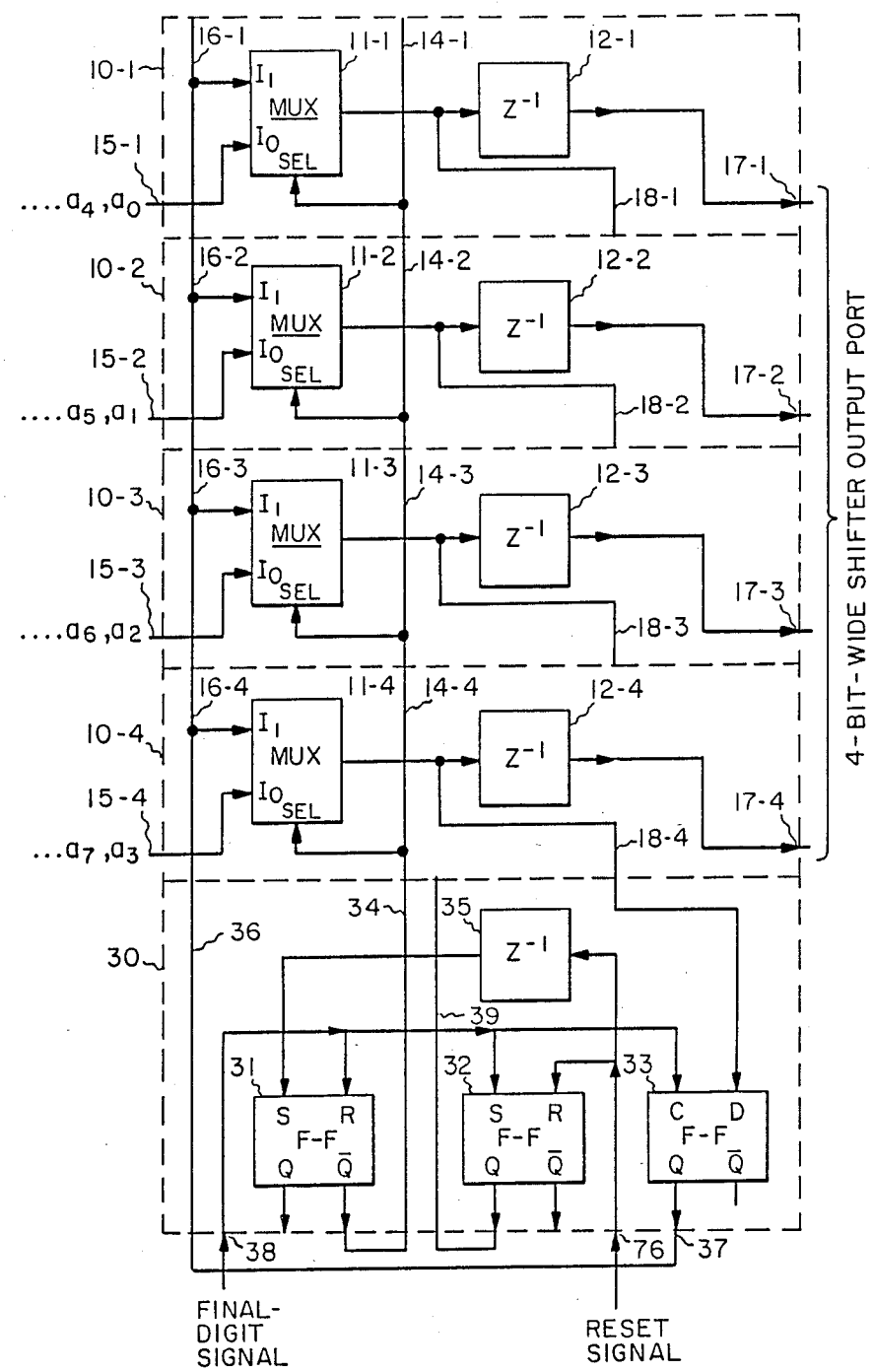
FIG. 6 is a schematic diagram of a shifter embodying the invention and shifting data right by an integral number of digits.

(In referring in the following detailed description of the basic cells shown in FIGS. 3, 4, 5, 12 and 13 and of shifters formed from these cells, directions and locations are described as they appear in the figures of the drawing when the drawing sheets on which they appear are held upright. In actuality, the cells will be arranged adjacent to each other in a mosaic along the surface of a monolithic integrated circuit normally denominated the "top surface" by integrated-circuit processing engineers.)

DETAILED DESCRIPTION

One may consider the n parallel bit streams of digit-serial data supplied as input signal to a data shifter to have the appearance below where the streams with advancing time run from left to right past the vertical line representing the present time.

$$\ldots d_8\ d_4\ d_0\ c_8\ c_4\ c_0\ b_8\ b_4\ b_0\ a_8\ a_4\ a_0$$
$$\ldots d_9\ d_5\ d_1\ c_9\ c_5\ c_1\ b_9\ b_5\ b_1\ a_9\ a_5\ a_1$$
$$\ldots d_{10}\ d_6\ d_2\ c_{10}\ c_6\ c_2\ b_{10}\ b_6\ b_2\ a_{10}\ a_6\ a_2$$
$$\ldots d_{11}\ d_7\ d_3\ c_{11}\ c_7\ c_3\ b_{11}\ b_7\ b_3\ a_{11}\ a_7\ a_3$$

Here $a_0$ through $a_{11}$ are the bits of a first number or data word; $b_0$ through $b_{11}$ are the bits of a second number or data word; $c_0$ through $c_{11}$ are the bits of a third number or data word, $d_0$ through $d_{11}$ are the bits of a fourth number or data word; etc. The digit width n is four, and there are three successive digits in each 12-bit number or word.

In a shift right, defined in the more conventional system of numbers as a shift towards reduced significance, the less significant bits of a number will be discarded as underflow, and the more significant binary places vacated by the shift will each be filled. This filling is done with a respective ZERO in the case of unsigned arithmetic and is done with a sign bit repetition in the case of signed arithmetic using the two's complement number system. A shift right by one binary place will alter the appearance of the n parallel bit streams of digit-serial data as follows, presuming signed arithmetic using two's complement numbers is used.

$$\ldots d_9\ d_5\ d_1\ c_9\ c_5\ c_1\ b_9\ b_5\ b_1\ a_9\ a_5\ a_1$$
$$\ldots d_{10}\ d_6\ d_2\ c_{10}\ c_6\ c_2\ b_{10}\ b_6\ b_2\ a_{10}\ a_6\ a_2$$
$$\ldots d_{11}\ d_7\ d_3\ c_{11}\ c_7\ c_3\ b_{11}\ b_7\ b_3\ a_{11}\ a_7\ a_3$$
$$\ldots d_{11}\ d_8\ d_4\ c_{11}\ c_8\ c_4\ b_{11}\ b_8\ b_4\ a_{11}\ a_8\ a_4$$

The bits $a_{11}$, $b_{11}$, $c_{11}$, $d_{11}$ are sign bits and are repeated to fill binary places vacated by the shift right.

A shift right by two binary places will alter the appearance of the n parallel bit streams as follows:

$$\ldots d_{10}\ d_6\ d_2\ c_{10}\ c_6\ c_2\ b_{10}\ b_6\ b_2\ a_{10}\ a_6\ a_2$$
$$\ldots d_{11}\ d_7\ d_3\ c_{11}\ c_7\ c_3\ b_{11}\ b_7\ b_3\ a_{11}\ a_7\ a_3$$
$$\ldots d_{11}\ d_8\ d_4\ c_{11}\ c_8\ c_4\ b_{11}\ b_8\ b_4\ a_{11}\ a_8\ a_4$$
$$\ldots d_{11}\ d_9\ d_5\ c_{11}\ c_9\ c_5\ b_{11}\ b_9\ b_5\ a_{11}\ a_9\ a_5$$

Again $a_{11}$, $b_{11}$, $c_{11}$, $d_{11}$ sign bits are repeated to fill binary places vacated by the shift right.

In a shift left, defined in the more conventional system of numbers as a shift towards increased significance, the more significant bits of a number will be discarded as overflow, and the less significant binary places vacated by the shift will each be filled by a ZERO. A shift left by one binary place will alter the appearance of the n parallel bit streams as follows:

$$\ldots d_7\ d_3\ 0\ c_7\ c_3\ 0\ b_7\ b_3\ 0\ a_7\ a_3\ 0$$
$$\ldots d_8\ d_4\ d_0\ c_8\ c_4\ c_0\ b_8\ b_4\ b_0\ a_8\ a_4\ a_0$$
$$\ldots d_9\ d_5\ d_1\ c_9\ c_5\ c_1\ b_9\ b_5\ b_1\ a_9\ a_5\ a_1$$
$$\ldots d_{10}\ d_6\ d_2\ c_{10}\ c_6\ c_2\ b_{10}\ b_6\ b_2\ a_{10}\ a_6\ a_2$$

The table in FIG. 1 of the drawing is generated employing the processes just described. Successive digits of a signal appear in a row extending from left to right in order of their appearance, each digit taking a particular columnar position in the row. The input signal to the data shifter is shown in the topmost row, and lower rows depict output signals for various shifts. Commas are inserted to indicate boundaries between words. (Lower-case b in the title of the table is an abbreviation for "bit".)

In studying the table of FIG. 1 or a more complete table of its type, a problem with the conventional shift operation manifests itself. For shift distances other than an integral number m of digits—i.e. other than mn bits—bits in the output signal of the shifter appear in different binary place positions than the bits in the input signal of the shifter. This led to the inventors at first attempting to correct the arrangement of bit places of the shifted output within the stacked bit-slice cells making up the shifter. Such schemes led to different types of bit-slice cells for each shift distance modulo n, which unacceptably increased the size of the library of basic cells that had to be stored in the silicon compiler by a factor of n. The inventors overcame this problem by disregarding the position of bits within the digit insofar as the selection of bits to be included in each digit is concerned. A braiding connection for transposing bit arrangement within each digit can be used after the bit selection procedure, if needed, and can be constructed using no more than two basic cells as will be described in detail further on in this specification. That is, the inventors reformulated the problem of generating shifts by dissecting the problem of providing shift into two separate steps. The first step is to select the bits to be included in a particular digit of output signal. The second step is to rotate the bits within each digit of selected bits, if this is necessary to complete the proper interface with ensuing digital hardware. This rotation is a barrel shift within each digit (not a barrel shift of a full word). The first step of providing shift without regard to bit permutation goes counter to one's natural instinct of what shift entails, one may note.

The table in FIG. 2 of the drawing shows the results of disregarding the permutation of bit order within digits in a shifter and concentrating instead upon the selection of bits to be included in each digit in a shift operation. Study of the FIG. 2 table (or a more complete table formulated by the procedures outlined above) reveals that the function generating each bit slice of the output signal selects the corresponding bit from the current digit of input signal, the corresponding bit from the preceding digit of input signal, a ZERO, or the sign bit of a two's complement number. Note that for a prescribed shift distance, the bit-slice cells servicing certain bit places have to have the capability at times to select the corresponding bit from the current digit of input signal but never need to select the corresponding bit from the preceding digit of input signal. For that same prescribed shift distance the bit-slice cells servicing the other bit places have to have the capability to select the corresponding bit from the preceding digit of input signal, but never need to select the corresponding bit from the current digit of input signal.

In the rightmost column of FIG. 2, the letter A or B associated with each bit slice position indicates whether the former (A) or latter (B) selection capability is required for that bit slice position for the given direction and number of bit places of shift. Note particularly that this selection does not vary from digit to digit, which is vital to the dissection of the problem of providing shift into the same separate two steps on a continuing basis. If the direction of shift is prescribed, none of the bit-slice cells will be called upon to output a ZERO at one time and the sign bit of a two's complement number at another time, since these selections are respectively associated with shift left and with shift right respectively.

These observations support a scheme for shifting using type A and type B bit slice cells. The type A bit slice cell has the capability for selecting a bit from the current digit of input signal to a digit of output signal k clock intervals later, k being a positive integer at least zero and in most instances preferably unity. The type B bit slice cell has the capability for selecting a bit from the current digit of input signal to a digit of output signal (k+1) clock intervals later. Both the A and B bit slice cells have the capability for selecting, from a broadcast bit bus running through all bit-slice cells, an output bit that is a ZERO for shifts left or is a sign bit for shifts right. The selection of output bit from the input signal or from the broadcast bit bus in each bit-slice cell is governed by control signal busses connecting to a control cell at one end of the stacked bit-slice cells.

A general rule is that a shift right by q bits can be done using q modulo n type A bit-slice cells in the pipelines for the less significant bit places and (n - q modulo n) type B bit-slice cells in the pipelines for the more significant bit places. A general rule is that shift left by m bits can be done using (n - q modulo n) type A bit-slice cells in the pipelines for the less significant bit places and q modulo n type B bit-slice cells in the pipelines for the more significant bit places. These general rules, if followed, would result in type B bit-slice cells being used in the pipelines for all n bit places when q modulo n equals zero. While this can be done, it results in a unit-delay of all bits that can be avoided by instead using type A bit-slice cells in the pipelines for all n bit places. FIG. 2 assumes this generally preferred alternative choice is made.

Indeed, in all the shifter patterns described, delays that would appear in the pipelines for all n bit-places are customarily suppressed in the data shifter. One notes that the extra digit delay in a shift left by five bit places as compared to a shift left by one bit place is suppressed in the FIG. 2 table concerning three by four-bit digit-serial words. In subsequent arithmetic operations delays will be inserted to suitably align digit-serial data that are to be processed together.

FIG. 3 depicts a type A bit-slice cell 10, which includes a multiplexer 11 and a clocked unit-delay element 12. Responsive to a first control signal received on a portion 14 of a first control bus (crossing the cell 10 in FIG. 3 vertically) being a ZERO, multiplexer 11 selects an input signal bit, as applied to an input signal bit connection of cell 10 at its side at left in FIG. 3 for application both to the input port of latch 12 and to a sign bit output connection 18 of cell 10 at its side at bottom in FIG. 3, Alternatively, responsive to the first control signal being a ONE, multiplexer 11 selects to the input port of unit-clock-delay element 12 and to sign bit output connection 18 a broadcast bit as supplied via a portion 16 of a broadcast bit bus (crossing cell 10 vertically in FIG. 3). One clock interval later delay element 12 supplies a bit, identical to that supplied its input port, to an output signal bit connection 17 of cell 10 at its side at right in FIG. 3.

FIG. 4 depicts a type B bit-slice cell 20, which includes not only a multiplexer 21 and a clocked unit-delay element 22 but also a further clocked unit-delay element 23. A portion 24 of the first control bus crosses the cell 20 just as the portion 14 of the first control bus crosses the cell 10. The portion 24 of the first control bus is not connected to in cell 20, but is used for the purpose of connecting through cell 20 from a control cell as shown in FIG. 5 to a type A bit-slice cell as shown in FIG. 3.

Responsive to a second control signal received on a portion 29 of a second control bus (crossing the cell 20 vertically in FIG. 3) being a ZERO, multiplexer 21 selects an input signal bit, as applied to an input signal bit input connection 25 at its side at left in FIG. 4, both to the input port of delay element 22 and to an output sign bit connection 28 of cell 20 at its side at bottom in FIG. 4. Alternatively, responsive to second control signal being a ONE, multiplexer 21 selects to the input port of delay element 22 and to sign bit output connection 28 a broadcast bit as supplied via a portion 26 broadcast bit bus 26, shown in FIG. 4 as crossing cell 20 vertically just as portion 16 of the broadcast bit bus crosses cell 10 in FIG. 3. One clock interval later delay element 22 supplies a bit, identical to that supplied to its input port, to the input port of the further delay element 23. During the next, still later clock interval the further delay element 23 supplies a bit, identical to that supplied its input port, to an output signal bit connection 27 of cell 20 at its side at right in FIG. 4.

Clocked unit-delay element 12 is used in cell 10, and two clocked unit-delay elements 22 and 23 rather than one are used in cell 20. This is done to ensure synchronization of data in the digit serial format and prevent differential bit slippage between supposedly parallel bit streams. The delay elements 12 and one of the cascaded delay elements 21, 22 also introduce a digit-interval delay into each signal or pipeline that compensates for the control cell 5 exhibiting delayed response to a FINAL-DIGIT SIGNAL applied thereto being ONE during the final digits of input signal words. The reason for this delayed response to FINAL-DIGIT SIGNAL is the special nature of the SR flip-flops, which will be explained below.

FIG. 5 shows the control cell 30 against which a number c, from zero to n-1, of FIG. 4 type B bit-slice cells and a number (n-c) of FIG. 3 type A bit-slice cells are stacked to form a shifter embodying the invention. Control cell 30 comprises set-reset (or SR) type flip-flops 31 and 32, a data (or D) type flip-flop 33 and a clocked unit-delay element 35.

The SR type flip-flops 31 and 32 are of a special clocked type in which Q output signal is determinate despite S set signal and R reset signal being simultaneously applied, or nearly so.

FIG. 5a shows the particular construction of the SR flip-flops 31 and 32. The cross-coupled feedback of NOR gates 71 and 72 differs somewhat from that of a conventional, non-clocked SR flip-flop. While the feedback connection from the output port of NOR gate 71 to an input port of NOR gate 72 is conventional, the feedback connection from the output port of NOR gate 72 to an input port of NOR gate 71 departs from convention by including a clocked unit-delay element 73. Q output signal is taken from the output port of delay element 73 so response of the Q output signal is delayed until the next C clock pulse. A logic inverter, or NOT gate, 74 is used to generate the $\overline{Q}$ output signal complementary to Q output signal. This has to be done in the FIG. 5A SR flip-flop because the output signal of NOR gate 71 is not necessarily the complement of Q output signal in the presence of S set signal. This can be seen from the truth table, following, of an SR flip-flop as shown in FIG. 5a.

| R | S | $Q_{NEXT}$ |
|---|---|---|
| 0 | 0 | hold |
| 0 | 1 | 1 |
| 1 | 0 | 0 |
| 1 | 1 | 0 |

$Q_{NEXT}$ is the condition at the true output connection Q when the next clock pulse occurs after a set or reset pulse. In certain forms of SR flip-flops the $\overline{Q}$ output signal as well as Q output signal may be available in clocked form so a separate logic inverter 74 is not necessary.

The true (Q) and not-true ($\overline{Q}$) output connections of SR flip-flop 31 are available for one of them to be connected to a portion 34 of the first control signal bus that crosses cell 30 vertically, so as to align at the side of cell 30 at top in FIG. 5 with the portion 24 or 14 of the first control signal bus in the bit-slice cell 20 or 10 stacked adjacent to cell 30 in the monolithic integrated-circuit layout. The true (Q) and not-true ($\overline{Q}$) output connections of SR flip-flop 32 are available for one of them to be connected to a portion 39 of the second control signal bus that crosses cell 30 at top in FIG. 5 with the second control signal bus 24 in a basic cell 20 as may be stacked against cell 30 in the monolithic i-c layout.

A portion 36 of the broadcast bit bus crosses cell 30 connecting at its end shown at top of FIG. 5 to the portion 26 or 16 of the broadcast bit bus in the bit-slice cell 20 or 10 adjoining control cell 30. During shift left operation the other end of portion 36 of the broadcast bit bus has a continuous ZERO level applied thereto. During shift right operation the other end of portion 36 of the broadcast bit bus is jumpered to a point 37 to receive a sign bit signal generated by D flip-flop 33.

D flip-flop 33 has a data input connection, a clock input connection and a true (Q) output connection connecting to the point 37. The data input connection connects from the sign bit output connection of the bit-slice cell handling the most significant bits of the digits of the input signal words. A FINAL DIGIT SIGNAL that is a ONE during the final digit of the input signal word is applied via a point 38 to the clock input connection of flip-flop 33 to latch the sign bit of an input signal word to appear at point 37 until the FINAL DIGIT SIGNAL that is a ONE reoccurs during the final digit of the next input signal word.

During all digits but the final digit of each input signal word a ZERO is applied via point 38. The sign bit latched by flip-flop 33 is utilized only during a shift right.

During shift right operation the not-true ($\overline{Q}$) output connection of SR flip-flop 31 and the true (Q) output connection of SR flip-flop 32 respectively connect to the first control signal bus 34 and to the second control signal bus 39 via respective jumper connections (not shown) at the side of cell 30 shown at the bottom of FIG. 5. The FINAL-DIGIT SIGNAL being ONE during the last digit of a word will cause the resetting of flip-flop 31 during at least the first digit of the next word. If a RESET SIGNAL is not applied during the last digit of a word preventing the setting of flip-flop 32, the FINAL DIGIT SIGNAL will also cause the setting of flip-flop 32 during at least the first digit of the next word. When SR flip-flops 31 and 32 are in reset and set conditions, respectively, ONEs are applied to portions 34, 24, 14 of the first control signal bus and to the portions 39, 29 of the second control signal bus. The ONEs cause the multiplexers 11 and 21 respectively in the bit-slice cells to select to their output ports the sign bit signal supplied them rather than the less significant bit places of input signal which are discarded during a shift right. This sign bit signal provides the sign bit extension of the previous input signal word that is needed in a shift right. When SR flip-flop 32 is reset by the RESET SIGNAL, it supplies a ZERO to the portions 39, 29 of the second control signal bus. Unless the RESET SIGNAL occurs during the final bit interval of a word, the interval after the RESET SIGNAL occurs, the flip-flop 31 is set by delay element 35 response to RESET SIGNAL to supply ZERO to the portions 24, 14 of the first control signal bus. The ZEROs supplied as control signals to multiplexers 21, 11 cause them to select to their output ports the input signals supplied to them.

During shift left operation, the true (Q) output connection of SR flip-flop 31 and the not-true ($\overline{Q}$) output connection of SR flip-flop 32 respectively connect to portion 34 of the first control signal bus and to portion 39 of the second control signal bus via respective jumper connections (not shown) at the side of cell 30 shown at the bottom of FIG. 5. The FINAL DIGIT SIGNAL provides for the subsequent unconditional resetting of flip-flop 31 and the conditional setting of flip-flop 32 at the beginning of the next input signal word, just as in shift right operation. When reset, flip-flop 31 applies a ZERO to portions 34, 24, 14 of the first control signal bus to cause multiplexers 11 to select their respective input signal bits from their respective input signal bit connections 15 to the delay elements 12 supplying the output signal bit connections 17. When flip-flop 32 is set, it applies a ZERO to portions 39, 29 of the second control signal bus to cause multiplexers 21 to select input signal bits from their respective input signal bit connections 15 to the cascades of delay elements 22, 23 supplying the output signal bit connections 27. Unless the RESET SIGNAL occurs during the penultimate digit of a word, flip-flop 31 is set the digit interval after flip-flop 32 is reset. These procedures place input signal bits in the more significant digits of the output signal, as is desired during shift left operations.

Flip-flop 31 in its set state supplies a ONE to portions 34, 24, 14 of the first control signal bus to cause the multiplexers 11 to select ZERO from the broadcast bit bus 16 to the delay elements 12 supplying the output signal bit connections 17; and flip-flop 32 in its set state applies a ONE to portions 39, 29 of the second control signal bus to cause multiplexers 21 to select ZERO from the broadcast bit bus 16 to the cascade of delay elements 22, 23 supplying the output signal bit connections 27. These procedures provide for ZERO fill of the less significant bit places of the shifter output signal, as is desired in a shift left.

While in a preferred embodiment of the invention a single type of control cell as shown in FIG. 5 is used for implementing either a shift right or a shift left, alternatively separate types of control cell can be used for such implementation. In a control cell only for shift right, the connection between the (Q) output of D flip-flop 33 to broadcast bit bus may be a permanent one provided by the control cell metallization pattern. In a control cell only for shift left, the D flip-flop 33 may be omitted altogether and provisions made for using the broadcast bus to a ZERO level voltage.

Referring back to FIG. 2, one will note that the same set of bit-slice cells can implement a shift right by one bit, five bits or nine bits. One will note that another set of bit-slice cells can implement a shift left by one bit, five bits or nine bits. The numbers of full digits involved in a shift is determined by the times of setting flip-flop 31 and resetting flip-flop 32. Flip-flop 31 is always set one digit later than flip-flop 32 is reset because of clocked latch 35 delaying the set signal applied to flip-flop 31 respective to the reset signal applied to flip-flop 32 via a point 76. Resetting flip-flop 32 at the beginning of the first digit of an input signal word by supplying to point 76 a ONE during the final digit of the input signal word digit will result in a shift right of up to one digit and a shift left of (m−1) digits up to less than m digits, where m is the number of digits per digit-serial word. Each delay of a digit in resetting flip-flop 32 will result in one more digit of shift right or in one less digit of shift left.

Resetting flip-flop 32 at the beginning of the first digit of the input signal word is accomplished by applying a ONE to its reset connection via point 76 during the final digit of the preceding input signal word. This is done at the same time a ONE is applied as FINAL-DIGIT SIGNAL via point 38 to the set connection of flip-flop 32. As previously noted in the truth table associated with an SR flip-flop of the type shown in FIG. 5a, the simultaneous application of ONEs to the set and reset connections of SR flip-flop 32 causes resetting, rather than setting, of the flip-flop in the following clock interval. Another effect flowing from the particular nature of the flip-flops 31 and 32 is noted when RESET SIGNAL is applied during the penultimate digit of a word, to reset flip-flop 32 during the last digit. The delayed response to RESET SIGNAL of delay element 35 will not be effective to set flip-flop 31 during the final digit of the input signal because the FINAL DIGIT SIGNAL being a ONE forces reset of flip-flop 31.

In addition to the bus 36, 26, 16 and the bus 34, 24, 14 crossing the control cell 30 and bit-slice cells 20, 10 shown in FIGS. 4 and 3, respectively, there will be other busses crossing these cells vertically. At least two such busses are used for supplying direct operating voltages to the circuit elements in these basic cells. At least one such bus is used to distribute clocking voltages to the clocked unit-delay elements in these basic cells. These additional busses have been omitted to avoid cluttering the drawing with details of merely incidental importance to the invention.

FIG. 6 shows the form a shifter for performing shift right takes when shifts are by whole digits that are four bits wide. Four bit-slice cells 10-1, 10-2, 10-3, 10-4 of the A type of FIG. 3 are stacked together with the control cell 30 of FIG. 5. Rightward shifting is provided for by connecting the not-true (Q̄) output connection of flip-flop 31 to portion 34 of the first control signal bus 34, 14-4, 14-3, 14-2, 14-1; the true (Q) output connection of flip-flop 32 to portion 39 of the second control signal bus; and the true (Q) output connection of flip-flop 33 to portion 36 of the broadcast bit bus 36, 16-4, 16-3, 16-2, 16-1.

The FINAL-DIGIT SIGNAL clocks D flip-flop 33 to cause it to latch the sign-bit from the most significant bit place of the final digit for application to portion 36 of the broadcast bit bus, to be used to fill vacated binary places at left of the shifted data. The FINAL-DIGIT SIGNAL also causes the resetting of flip-flop 31 and setting of flip-flop 32 at the beginning of the first digit of the next input data word. The resetting of flip-flop 31 conditions multiplexers 11-1, 11-2, 11-3 and 11-4 during at least the first digit of the next digit-serial input word to select sign bit signal bits from the broadcast bit bus 36, 16-4, 16-3, 16-2, 16-1 to delay elements 12-1, 12-2, 12-3, and 12-4 respectively, in bit slice cells 10-1, 10-2, 10-3 and 10-4.

If the RESET SIGNAL is applied via point 76 to flip-flop 32 contemporaneously with the FINAL-DIGIT SIGNAL, the response to RESET SIGNAL developed one digit later by delay element 35 will cause delayed setting of flip-flop 31 at the beginning of the second digit of the next input signal word. This setting of flip-flop 31 conditions multiplexers 11-1, 11-2, 11-3 and 11-4 to select input signal bits to delay elements 12-1, 12-2, 12-3 and 12-4 respectively during the second through final digits of that next input signal word. This would establish a one-digit or four-bit shift right, wherein the sign bit is repeated an additional digit.

If the RESET SIGNAL applied via point 76 to flip-flop 32 is delayed one clock cycle respective to the final-digit signal, so flip-flop 31 is set a digit later, the sign bit is repeated during the next two digits to establish a two-digit or eight-bit shift right. Each further delay of a clock cycle in applying RESET SIGNAL to flip-flop 32 provides a further digit, or four bits, of shift right.

Figure 7:
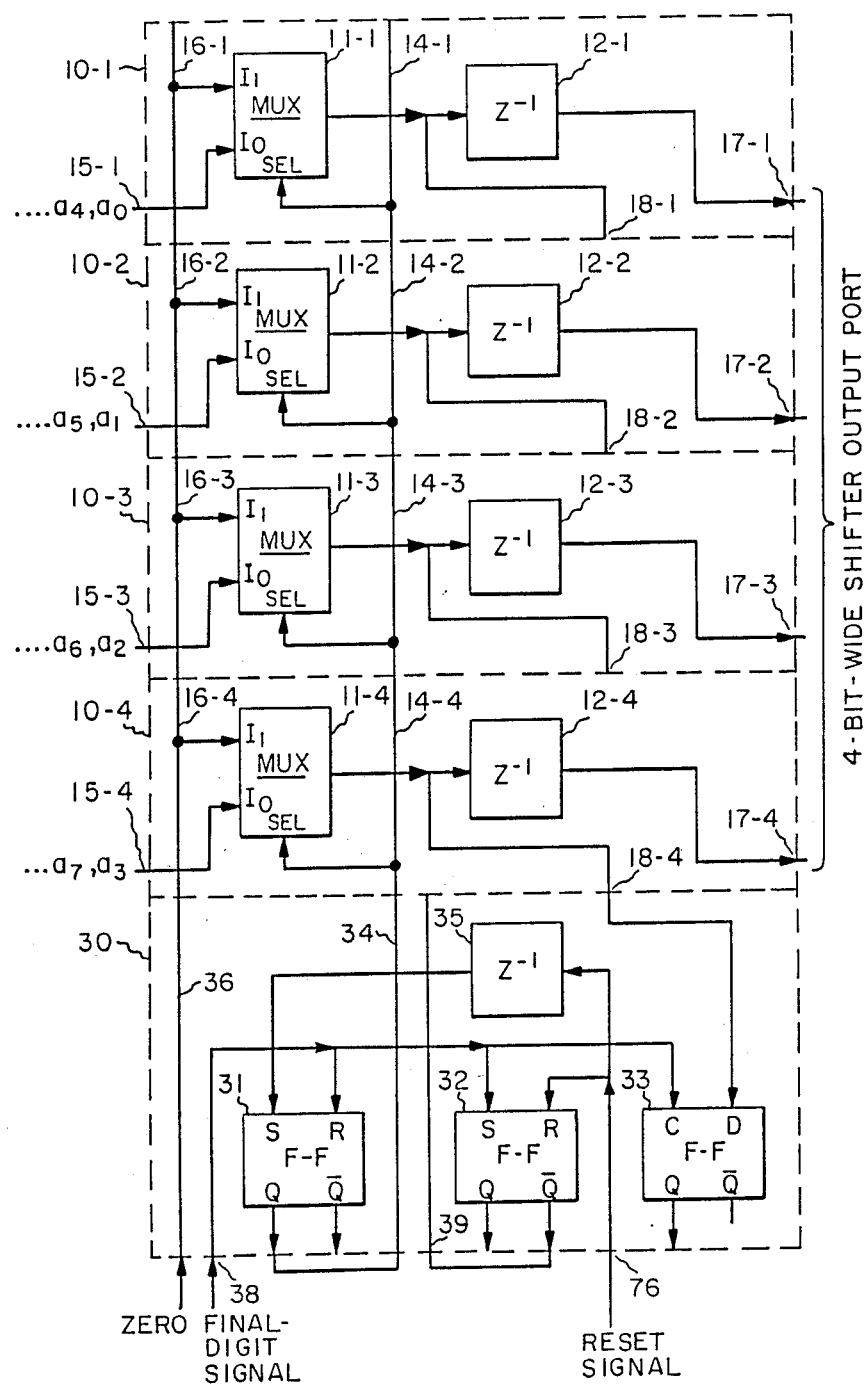
FIG. 7 is a schematic diagram of a shifter embodying the invention and shifting data left by an integral number of digits.

FIG. 7 shows the form a shifter for performing shifts left takes when shifts are by whole digits that are four bits wide. The same four bit-slice cells 10-1, 10-2, 10-3, 10-4 of the A type stacked together with the control cell 30 are used as in the FIG. 6 shifter but the jumper connections of control cell 30 differ so as to implement the shift left. Leftward shifting is provided for by applying ZERO to portion 36 of the broadcast bit bus 36, 26-2, 26-1, 16-2, 16-1; by connecting the true(Q) connection of flip-flop 31 to portion 34 of the first control signal bus 34, 24-2, 24-1, 14-2, 14-1; and by connecting the not-true (Q̄) connection of flip-flop 32 to portion 39 of the second control signal bus. The FINAL-DIGIT SIGNAL conditionally causes the resetting of flip-flop 31 during the next clock interval to condition multiplexer 11-1, 11-2, 11-3 and 11-4 to select input signal bits 36 to clocked latches 12-1, 12-2, 12-3 and 12-4, respectively, during at least the first digit of the next input signal word.

If the RESET SIGNAL supplied via point 76 to flip-flop 32 is contemporaneous with the FINAL-DIGIT SIGNAL, causing flip-flop 32 to be reset rather than set for the first digit of the next input signal word, the set signal developed from RESET SIGNAL one digit later by delay element 35 will set flip-flop 31. The setting of flip-flop 31 at the beginning of the second digit of the next input signal word conditions multiplexers 11-1, 11-2, 11-3 and 11-4 to select to delay elements 12-1, 12-2, 12-3 and 12-4 the ZERO during the second through penultimate digits of that next input signal word. This establishes an (m−1)-digit shift left.

If RESET SIGNAL is delayed one clock cycle respective to the FINAL-DIGIT SIGNAL, so flip-flop 31 is set a digit later, selection of digits of input signal bits takes place during the first and second digits of the input signal word, while flip-flop 31 remains in reset. Then, the resetting of flip-flop 31 at the beginning of third digit conditions mutiplexers 11-1, 11-2, 11-3 and 11-4 to select ZERO from the broadcast bit line 16-1, 16-2, 16-3, 16-4, 36 rather than input signal bits during the third through last digits of the input signal word. This establishes an (m−2)-digit shift left. Each further delay of a clock cycle in applying reset signal to flip-flop 32, and thus set signal to flip-flop 31 a digit interval later, decreases shift left by a further digit. An (m−2) clock delay, so as to place the reset signal for flip-flop 32 two clock cycles (or digits) earlier than the final-digit signal, will result in an one-digit or four-bit shift left.

When shifts by whole digits are performed, no barrel shift of the bit positions in each digit of the output signal from the stacked bit-slice cells is required to restore normal bit order. Where shifts by numbers of bits not evenly divisible into fixed-length digits are to be performed, such barrel shift may be required, however. Consider now shifters for shifting four-bit-wide digit-serial data by even numbers of bits not evenly divisible into digits of four bits. These shifters will comprise pairs of bit-slice cells 20-1 and 20-2 of B type replacing bit-slice cells 10-3 and 10-4 in the arrangements of FIGS. 6 and 7, respectively, and possibly braiding to provide barrel shift in cascade thereafter.

Figure 8:
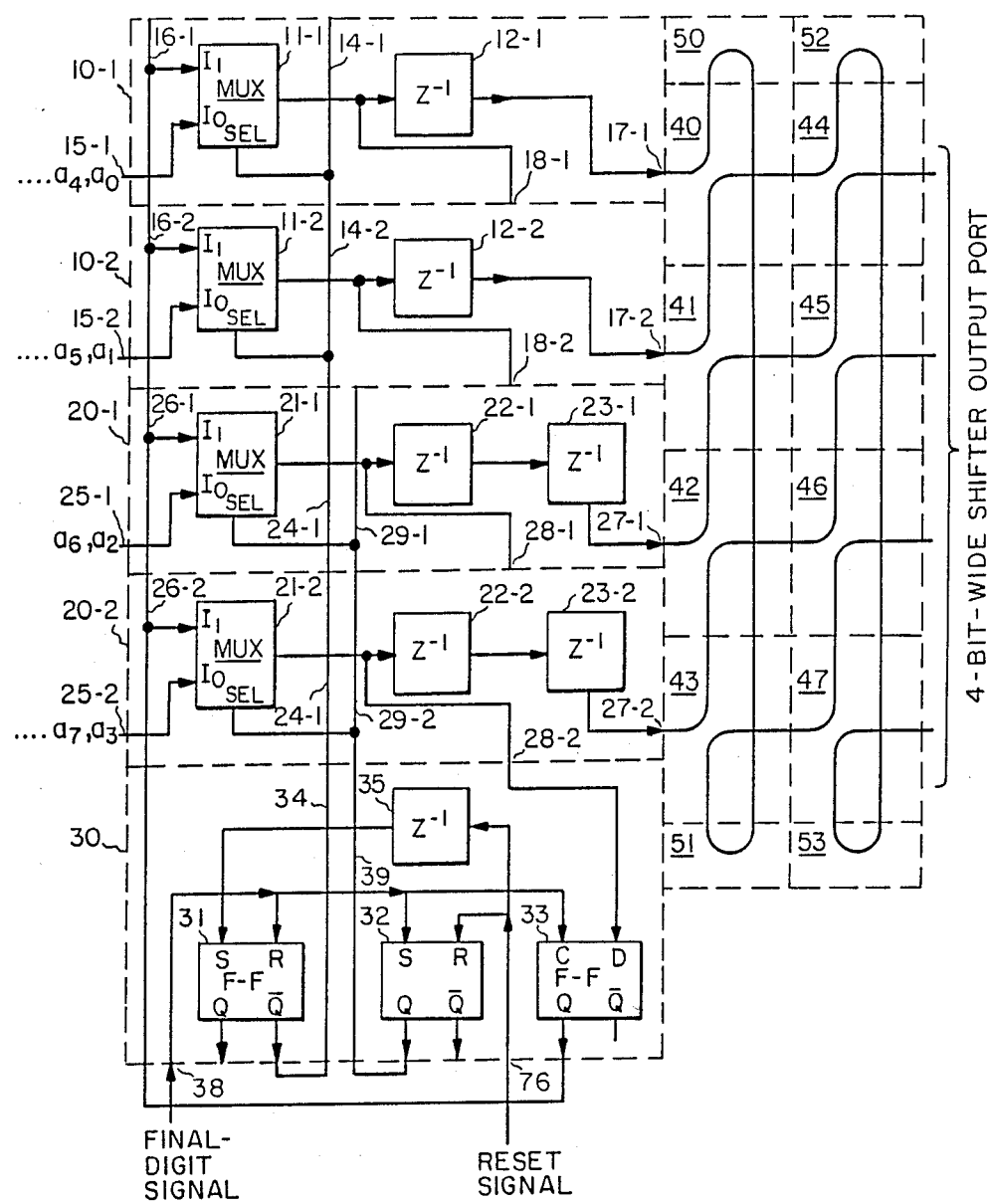
FIG. 8 is a schematic diagram of a shifter embodying the invention and shifting data right by a number of bits that is not a multiple of the number of bits per digit.

FIG. 8 shows the shifter for performing shift right by an even number of bits not evenly divisible by four, the number of bits per digit in the digit-serial apparatus. Again, rightward shifting is provided for by connecting the not-true ($\bar{Q}$) output connection of flip-flop 31 to portion 39 of the first control signal bus, the true (Q) output connection of flip-flop 32 to portion 34 of the second control signal bus, and the true (Q) output connection of flip-flop 33 to portion 36 of the broadcast bit bus.

The FINAL-DIGIT SIGNAL clocks D flip-flop 33, so D flip-flop 33 latches the sign bit from the most significant bit place of the final digit for application to portion 36 of the broadcast bit bus. The FINAL-DIGIT SIGNAL also causes the resetting of flip-flop 31 and the setting of flip-flop 32 at the beginning of the first digit of the following input signal word. The resetting of flip-flop 31 conditions multiplexers 11-1 and 11-2 to select sign bit from the broadcast bit bus to delay elements 12-1 and 12-2, respectively, in the bit-slice cells 10-1 and 10-2 of A type. The setting of flip-flop 32 conditions multiplexers 21-1 and 21-2 to select sign bit from the broadcast bit bus to delay elements 22-1 and 22-2, respectively, in bit-slice cells 20-1 and 20-2 of B type.

Suppose the RESET SIGNAL supplied to flip-flop 32 via point 76 occurs in the same clock interval as the FINAL-DIGIT SIGNAL. Then, flip-flop 32 resets at the beginning of the first digit of the next input signal word supplied to the shifter. The set signal developed from RESET SIGNAL by delay element 35 causes the setting of flip-flop 31 at the beginning of the second digit of that next input signal word. Multiplexers 11-1 and 11-2 select sign bit from the broadcast bit bus 36, 16-4, 16-3, 16-2, 16-1 during the first digit responsive to flip-flop 31 being reset. Sign bits are thus included in a shifter output digit together with bits corresponding to the input signal bits of the previous input signal word as stored in the penultimate delay elements 23-1 and 23-2 of the bit-slice cells 20-1 and 20-2 of B type. Thereafter in all remaining digits of the next word, with flip-flop 31 being set and flip-flop 32 being reset, multiplexers 11-1, 11-2, 21-1 and 21-2 all select input signal bits to their respective ensuing delay elements 12-1, 12-2, 22-1 and 22-2. A shift right of two bits is therefore implemented.

Each incremental digit of delay between the FINAL-DIGIT SIGNAL and the first reset signal will increase the shift right by an additional digit or four bits. Each earlier output digit from the FIG. 8 shifter then combines two less significant bits from a more recent digit with two more significant bits from the preceding digit.

Figure 9:
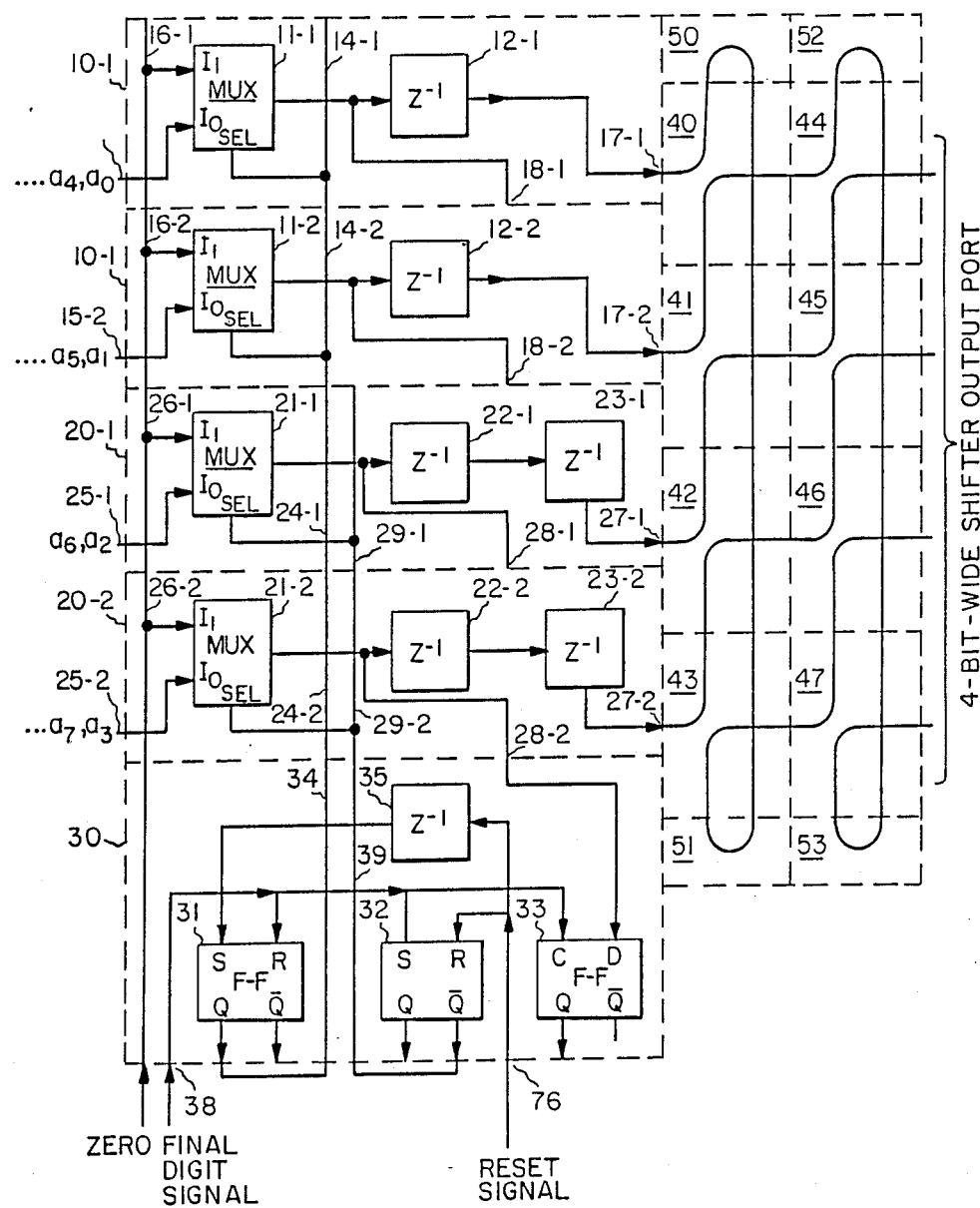
FIG. 9 is a schematic diagram of a shifter embodying the invention and shifting data left by a number of bits that is not a multiple of the number of bits per digit.

FIG. 9 shows the shifter for performing a shift left by an even number of bits not evenly divisible by four, the number of bits per digit in the digit-serial apparatus. Leftward shifting is provided for by applying ZERO to portion 36 of the broadcast bit bus and by connecting the true (Q) output connection of flip-flop 31 and the not-true ($\bar{Q}$) connection of flip-flop 32 to portion 34 of the first control signal bus and to portion 39 of the second control signal bus, respectively. The FINAL-DIGIT SIGNAL causes SR flip-flop 31 to be reset at the beginning of the next input word, to condition multiplexers 11-1 and 11-2 to select input signal bits to delay elements 12-1 and 12-2, respectively. The FINAL-DIGIT SIGNAL also causes SR flip-flop 32 to be set at the beginning of the next input word, to condition multiplexers 21-1 and 21-2 to select input signal bits to delay elements 22-1 and 22-2, respectively.

If the RESET SIGNAL applied to flip-flop 32 via point 76 is delayed until the penultimate digit of the next digital-serial input signal word, shift left by two bits is obtained. In all digits except the first ones of input signal words, multiplexers 11-1, 11-2, 21-1 and 21-2 select the input signal bits to their respective delay elements 12-1, 12-2, 22-1 and 22-2. Accordingly, the second through last output digits from the FIG. 9 shifter each combine two less significant bits from a more recent digit with two more significant bits from the preceding digit. The resetting of flip-flop 32 before the final digit, conditions multiplexers 21-1 and 22-2 to select ZERO from broadcast bit bus 36. With the extra clocked delay in bit-slice cells of B type these ZEROs are stored to appear together with two current input signal bits in the first digit of the next output word.

These shifters in accordance with the invention which shift by numbers of bits not evenly divisible into digits, as noted previously, rotate the bit place order of the shifted data within each digit. Usually, bit place order must be restored to that of conventional digit-serial format. This can be accomplished by barrel shifting of bits within each digit in a prescribed direction using braiding connections.

In the FIG. 8 and 9 shifters the two-bit rotate right within each digit is augmented by a further two-bit rotate right to place bits back in correct bit places insofar as the digit-serial data convention is concerned. A first column of braid-slice cells 40-43 capped by braid-cap cells 50 and 51 does a first one-bit rotation right of FIG. 8 or 9 shifter output. A second column of braid-slice cells 44-47 capped by braid-cap cells 52 and 53 does a second one-bit rotation right of the shifter output Braid-slice cells 40-47 are all of the type shown in FIG. 12.

Figure 10:
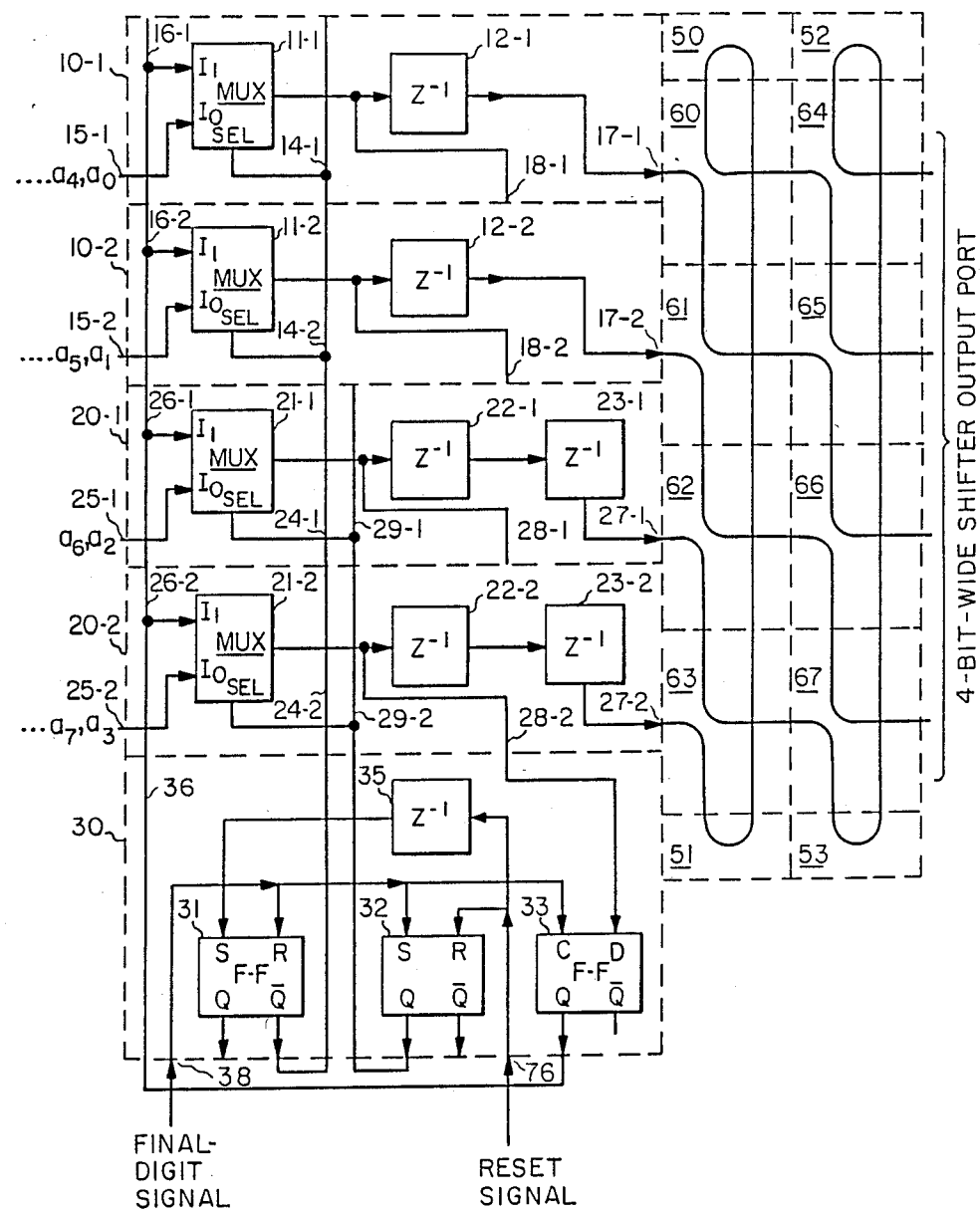
FIGS. 10 and 11 are schematic diagrams of shifters alternative to those shown in FIGS. 8 and 9, respectively.
Figure 11:
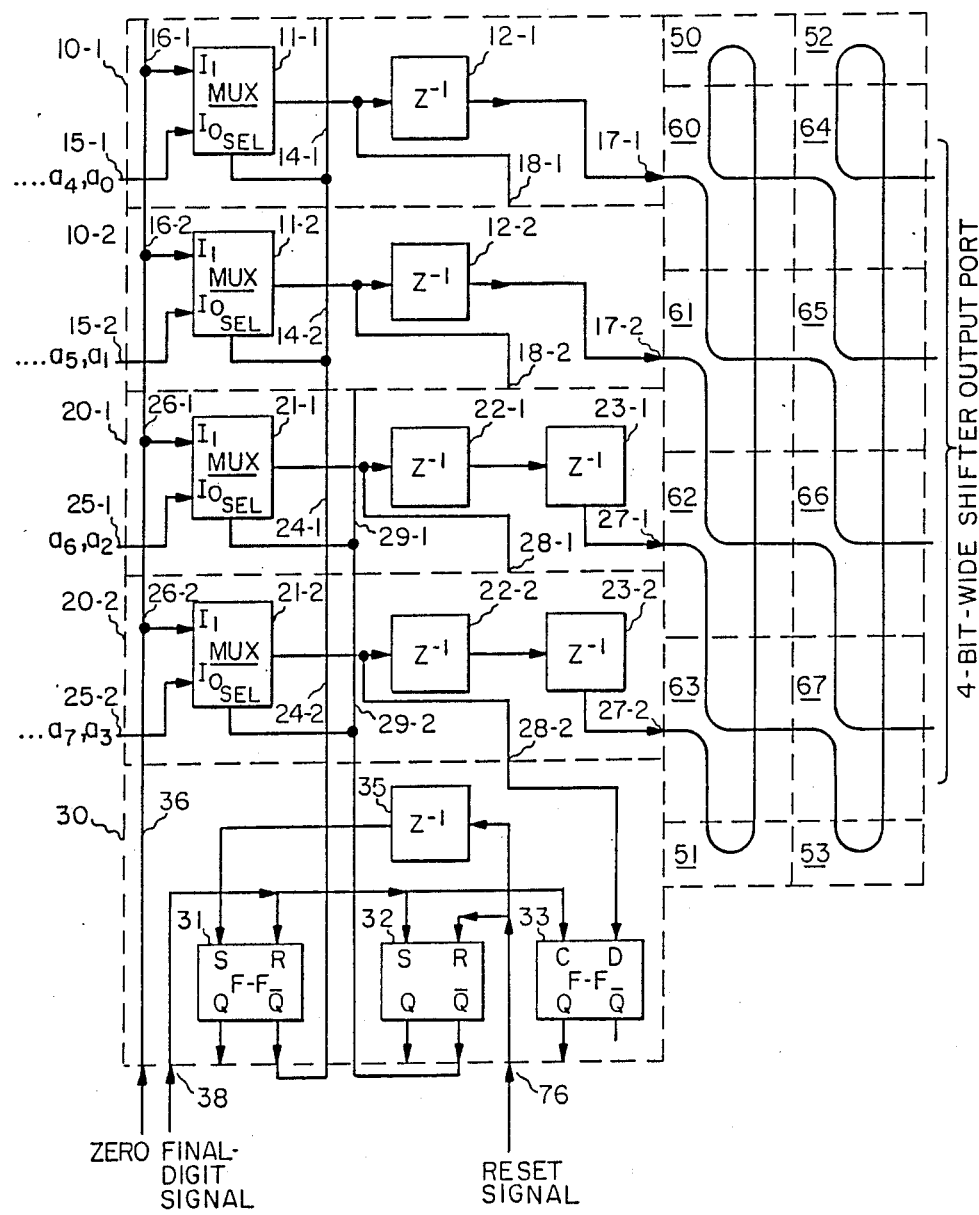

Alternatively, as shown in FIGS. 10 and 11, respectively, the two-bit rotation right introduced into each digit by bit-slice cells 10-1, 10-2, 20-1, 20-2 under control of control cell 30 may be countervailed by a two-bit rotation left. A first column of braid-slice cells 60-63 capped by braid-cap cells 50 and 51 does a first one-bit rotation left of FIG. 10 or 11 shifter output. A second column of braid-slice cells 64-67 capped by braid-cap cells 52 and 53 does a second one-bit rotation left of the shifter output Braid-slice cells 60-67 are all of the type shown in FIG. 13.

FIG. 14 braid-cap cell is common to the barrel shifters in FIGS. 8, 9, 10 and 11. A shift of a half digit requires that a rotation of a half digit be accomplished within each digit to restore shifter output to conventional digit-serial format, irrespective of whether that rotation be to the right or to the left. It is preferable to rotate to the right when shifts of less than half a digit are involved and to the left when shifts of more than half a digit are involved, in that the number of bits of rotation is thereby minimized.

Comparing the braid-slice cells of FIGS. 12 and 13 one will note that, providing the input and output interfaces are exactly midway along aside, either can be created from the other by inversion of the other. A silicon compiler can lay out the basic cells it stores inverted, perverted or both inverted and perverted on the monolithic die surface. Topologically speaking, the braid-slice cells of FIGS. 12 and 13 are in substantial accordance. In the claims which follow and claim from the figures of the drawing, inversion or perversion should be considered irrelevant in determining substantial accordance with the figures. So should the exact point along a side that a bus crosses, generally, the important thing being that bus portions in adjoining basic cells be in alignment where continuous busses across the basic cells are desired. Variation in the placement of circuit elements within cells does not affect the topology of connections between cells, and there will be substantial accordance with the figures despite such variation in placement.

What is claimed is:

1. A shifter for digit-serial input signal having m-digit words supplied in successive n-bit digits, which successive digits are supplied in respective digit intervals and are consecutively ordinally numbered modulo m from first to zeroeth in each successive word, where m and n are each a respective positive integer greater than or equal to two, said shifter comprising:
    a control cell generating first and second control signals supplied via a first control signal bus and a second control signal bus respectively:
    first and second flip-flops of a synchronous SR type included in said control cell, each of said first and second flip-flops having a set input connection, a reset input connection, and true and not-true output connections which are complementary to each other, each of said first and second flip-flops responding to a ONE signal applied to its set or reset connection during a current digit interval only after a new digit interval is reached, each of said first and second flip-flops responding to ONEs being applied to both its set and reset connections as if a ONE were applied only to its reset connection, one of the output connections of said first flip-flop supplying said first control signal to said first control signal bus and a complementary one of the output connections of said second flip-flop supplying said second control signal to said second control signal bus;
    means for applying a final-digit signal to the reset input connection of said first flip flop and to the set input connection of said first flip-flop, said final-digit signal being a ONE during the zeroeth digits of words of said digit-serial input signal and being a ZERO during all other digits of said digit-serial input signal;
    means for applying a reset signal to the reset input connection of said second flip-flop, said reset signal having a value of ONE during digits of said digit-serial input signal having a specified ordinal number modulo m, and said reset signal having a value of ZERO during the remaining digits of said digit-serial input signal;
    means for applying a set signal to the set input connection of said first flip-flop, said set signal having a value of ONE during the digits of said digit-serial input signal having an ordinal number modulo m one more than said specified ordinal number modulo m, and said set signal having a value of ZERO during the remaining digits of said digit-serial input signal;
    a plurality n in number of bit-slice cells consecutively ordinally numbered from first through nth, having respective input signal bit connections receptive of bits of said digit serial input signal with significance increasing with increase in the ordinal number of the bit-slice cell, having respective output signal bit connections, and sharing a broadcast bit bus;
    a respective multiplexer included in each of said n bit-slice cells, having a respective first input connection to the input signal bit connection of the bit-slice cell that multiplexer is included in, having a respective second input connection to said broadcast bit bus, and having a respective output connection selecting a bit from said broadcast bit bus or from said input signal bit connection of the bit-slice cell in accordance with one of said first and second control signals supplied via its respective bus;
    at least one respective clocked unit-delay element included in each of said n bit-slice cells between the output connection of the multiplexer in that bit-slice cell and the output signal bit connection of that bit-slice cell, and arranged for being clocked at digit rate for said digit-serial input signal; and
    means for applying a broadcast bit signal to said broadcast bit bus.

2. A shifter as set forth in claim 1 wherein said means for applying said set signal essentially consists of a further clocked unit-delay element, included within said control cell for delaying said reset signal by one clock interval, and arranged for being clocked at digit rate for said digit-serial input signal, thereby to generate said set signal.

3. A shifter as set forth in claim 1
wherein each and every one of said bit-slice cells has only a single clocked unit-delay element connecting from the output connection of its multiplexer to its own output signal bit connection; and
wherein the respective multiplexer of each and every one of said bit-slice cells is controlled by said first control signal as supplied via said first control signal bus, whereby a shift by an integral number of digits is provided.

4. A shifter as set forth in claim 3
wherein said first control signal bus is supplied first control signal from the not-true output connection of said first flip-flop; and
wherein said means for applying a broadcast bit signal to said broadcast bit bus essentially consists of a third flip-flop of D type included in said control cell, provided with a clock input connection to which said final-digit signal is applied, provided with a data input connection from the output connection of said multiplexer in said $n^{th}$ bit-slice cell, and provided with an output connection to said broadcast bit bus.

5. A shifter as set forth in claim 3
wherein said first control signal bus is supplied first control signal from the true output connection of said first flip-flop; and
wherein said means for applying a broadcast bit signal to said broadcast bit bus consists of means for applying a ZERO to said broadcast bit bus.

6. A shifter as set forth in claim 3
wherein said control cell and said bit-slice cells are contained in respective rectangular areas of a monolithic integrated circuit;
wherein the rectangular areas containing said bit-slice cells are congruent and have equal dimensions along their respective first sets of opposed sides and along their respective second sets of opposed sides;
wherein the rectangular area containing said control cell has a first set of opposed sides of equal dimensions with the first sets of opposed sides of the rectangular areas containing said bit-slice cells;
wherein said rectangular areas containing bit-slice cells are arranged in contiguous linear array with their second sets of opposed sides in alignment with each other;
wherein said rectangular area containing said control cell adjoins one end of said contiguous linear array with its second sets of opposed sides of said rectangular areas containing bit-slice cells;
wherein said broadcast bit bus and said first control bus each have respective segments that cross between the first set of opposed sides of each of the rectangular areas containing said bit-slice cells, and have respective segments that cross into said control cell; and
wherein said input signal bit connection and output signal bit connection of each bit-slice cell are on respective ones of the second set of opposed sides of the rectangular area containing that bit slice cell.

7. A shifter as set forth in claim 6
wherein each bit-slice cell has a sign bit connection from the output connection of its multiplexer available on the one of its first set of sides relatively proximal to said control cell; and
wherein a third flip-flop of D type is included in said control cell, has a clock input connection to which said final-digit signal is applied, has a data input connection from the sign bit connection of said $n^{th}$ bit-slice cell.

8. A shifter as set forth in claim 7 including:
a braiding for rearranging the order of the output signal bits from said n bit-slice cells to place those bits in proper digit-serial order.

9. A shifter as set forth in claim 1
wherein each bit-slice cell of lower ordinal number is of a first type corresponding to a less significant bit of said input signal digit;
wherein each bit-slice of higher ordinal number is of a second type corresponding to a more significant bit of said input signal digit;
wherein each bit-slice cell of the first type has only a single clocked unit-delay element connected from the output connection of its multiplexer to its own output signal bit connection;
wherein the respective multiplexer of each bit-slice cell of the first type is controlled by said first control signal as supplied via said first control signal bus;
wherein each bit cell of the second type has two clocked latches connected in cascade from the output connection of its multiplexer to its own output signal bit connection; and
wherein the respective multiplexer of each bit-slice cell of the second type is controlled by said second control signal as supplied via said second control signal bus.

10. A shifter as set forth in claim 9
wherein said first control bus is supplied first control signal from the not-true connection of said first flip-flop;
wherein said second control bus is supplied second control signal from the true output connection of said second flip-flop; and
wherein said means for applying a broadcast bit signal to said broadcast bit bus essentially consists of a third flip-flop of D type included in said control cell, having a clock input connection to which said final-digit signal is applied, having a data input connection from the output connection of said multiplexer in said $n^{th}$ bit-slice cell, and having an output connection to said broadcast bit bus.

11. A shifter as set forth in claim 10 including a braiding for rotating the order of the output signal bits from said n bit-slice cells to place those bits in proper digit-serial order.

12. A shifter as set forth in claim 7
wherein said first control bus is supplied first control signal from the true output connection of said first flip-flop;
wherein said second control bus is supplied second control signal from the not-true output connection of said second flip-flop; and
wherein a ZERO is applied to said broadcast bit bus.

13. A shifter as set forth in claim 12 including a braiding for rotating the order of the output signal bits from said n bit-slice cells to place those bits in proper digit-serial order.

14. A shifter as set forth in claim 9
wherein said bit-slice cells are contained in congruent respective rectangular areas of a monolithic integrated circuit, which areas are ordinally numbered first through $n^{th}$ in accordance with the first through $n^{th}$ bit-slice cells they respectively contain, which areas have equal dimensions along their respective first sets of opposed sides and along their respective second sets of opposed sides, and which areas are arranged in contiguous linear array in order of their ordinal numbering with their second sets of opposed sides in alignment with each other;

wherein said control cell is contained in an $(n+1)^{th}$ rectangular area of said integrated circuit, having a first set of opposed sides one of which adjoins one of the first set of opposed sides of said $n^{th}$ rectangular area, and having a second set of opposed sides in alignment with the second sets of opposed sides of said first through $n^{th}$ rectangular areas;

wherein said broadcast bit bus and said first control bus each have respective segments that cross between the first set of opposed sides of each of the rectangular areas containing said bit-slice cells, and have respective segments that cross into said control cell; and wherein said broadcast bit bus and said first control bus each cross each of said first through $n^{th}$ rectangular areas and cross into said $(n+1)^{th}$ rectangular area;

wherein said second control bus crosses each of said rectangular areas containing a bit slice cell with higher ordinal number; and wherein said input signal bit connection and said output signal bit connection of each bit-slice cell are similarly located on respective first and second ones of the second set of opposed sides of the rectangular area containing that bit cell.

15. A shifter as set forth in claim 14 wherein a third flip-flop of D type is included in said control cell, has a data input connection from the output connection of said clocked latch in said $n^{th}$ bit-slice cell, and has an output connection that extends to the one of the first set of opposed sides of said $(n+1)$th rectangular area that is furthest from said $n^{th}$ rectangular area.

16. A shifter as set forth in claim 14 in combination with a braiding for rearranging the order of the output signal bits from said n bit-slice cells to place these bits in proper digit serial order;

wherein a positive integer x, greater than or equal to 1, is used to define a multiplexer between one and (m−1), inclusive;

wherein said braiding is constructed from xn braid-slice cells and from x2 braid-cap cells contained within respective rectangular areas on said monolithic integrated circuit, said braid-slice cells being consecutively ordinally numbered first through $xn^{th}$;

wherein the rectangular areas containing said braid-slice cells are congruent with each other, have respective first sets of opposed sides and have respective second sets of opposed sides of equal lengths to said second sets of opposed sides of said rectangular areas containing said bit-slice cells;

wherein the rectangular areas containing said braid-cap cells have respective first sets of opposed sides of equal lengths to the first sets of opposite sides of the rectangular areas containing said braid-slice cells and have respective second sets of opposed sides;

wherein rectangular areas containing said braid-slice cells are arranged in closely-packed rows with rectangular areas containing bit-slice cells having the same ordinal number modulo n, thereby being arranged in number of columns equal to x;

wherein said braid-slice cells are similar to each other and are of a type for providing a wired barrel shift of each successive digit right one bit position per column;

wherein each braid slice cell includes a respective first connection line crossing from one of its said first set of opposed sides to the other, parallel to its said second set of opposed sides;

wherein each braid-slice cell includes a respective second connection line connecting from a point on a first of its second set of opposed sides to a point on a first of its first set of opposed sides;

wherein each braid slice cell includes a respective third connection line crossing from a point on a second of its first set of opposed sides to a point on a second of its second set of opposed sides, the points on said first set of opposed sides of each braid-slice cell being equally distant from the first of its said second set of opposed sides, the points on said second set of opposed sides of each braid-slice cell being equally distant from the first of its said first set of opposed sides, and the points on the sides of said braid-slice cells adjoining sides of said bit-slice cell being aligned with the points on the second ones of said second sets of opposed sides of said bit-slice cells to which their output signal bit connections extend; and wherein each of the columns of rectangular areas containing braid-slice cells is capped at each end with a respective said braid-cap cell, each braid-cap cell including a connection line thereon between connection lines extending to the edge of the adjoining braid-slice cell.

17. A shifter as set forth in claim 14 in combination with a braiding for rearranging the order of the output signal bits from said n bit-slice cells to place these bits in proper digit serial order;

wherein a positive integer x, greater than or equal to 1, is used to define a multiplexer between one and (m−1), inclusive;

wherein said braiding is constructed from xn braid-slice cells and from x2 braid-cap cells contained within respective rectangular areas on said monolithic integrated circuit, said braid-slice cells being consecutively ordinally numbered first through $xn^{th}$;

wherein the rectangular areas containing said braid-slice cells are congruent with each other, have respective first sets of opposed sides, and have respective second sets of opposed sides of equal lengths to said second sets of opposed sides of said rectangular areas containing said bit-slice cells;

wherein the rectangular areas containing said braid-cap cells have respective first sets of opposed sides of equal lengths to the first sets of opposed sides of said braid-slice cells and have respective second sets of opposed sides;

wherein rectangular areas containing said braid-slice cells are arranged in closely-packed rows with rectangular areas containing bit-slice cells having the same external number modulo n, thereby being arranged in number of columns equal to x; and wherein said braid slice cells are similar to each other and are of a type for providing a wired barrel shift of each successive digit left one bit position per column;

wherein each braid slice cell includes a respective first connection line crossing from one of its said first set of opposed sides to the other parallel to its said second set of opposed sides;

wherein each braid-slice cell includes a respective second connection line connecting from a point on a first of its second set of opposed sides to a point on a first of its first set of opposed sides;

wherein each braid slice cell includes a respective third connection line crossing from a point on a second of its first set of opposed sides to a point on a second of its second set of opposed sides, the points on said first set of opposed sides of each braid-slice cell being equally distant from the first of its said second set of opposed sides, the points on said second set of opposite sides of each braid slice cell being equally distant from the first of its said first set of opposed sides, and the points on the sides of said braid slice cells adjoining sides of said bit-slice cell being aligned with the points on the second ones of said second sets of opposed sides of said bit-slice cells to which their output signal bit connections extend; and wherein each of said columns of rectangular areas containing braid-slice cells is capped at each end with a respective said braid-cap cell, each braid-cap cell including a connection line therein between connection of lines extending to the edge of the adjoining braid-slice cell.

18. A shifter for digit-serial input signal having m-digit words supplied in successive n-bit digits, which successive digits are consecutively ordinally numbered modulo m from first to zeroeth in each successive word, where m and n are each a respective positive integer greater than or equal to two, said shifter comprising:

a control signal bus;

a control cell for generating a control signal and supplying that control signal via said control signal bus;

a first flip-flop of RS type included in said control cell having a set input connection, a reset input connection, a true output connection and a not-true output connection, one of which output connections supplies said control signal to said control bus;

means for applying a final-digit signal to the reset input connection of said first flip-flop, said last final-digit signal being a ONE during the zeroeth digits of said digit signal being a ONE during the zeroeth digits of said digit-serial input signal and being a ZERO during all other digits of said digit-serial input signal;

means for applying a set signal to the set input connection of said first flip-flop, said set signal having a value of ONE during digits of said digit-serial input signal having a specified ordinal number modulo m, and said set signal having a value of ZERO during the remaining digits of said digit-serial input signal;

a plurality n in number of similar bit-slice cells consecutively ordinally numbered first through $n^{th}$, having respective input signal bit connections receptive of bits of said digit-serial input signal with significance increasing with increase in the ordinal number of the bit-slice cell, having respective output signal bit connections, and sharing a broadcast bit bus, and sharing said first control signal bus;

a respective multiplexer included in each of said n bit-slice cells, having a respective first input connection to the input signal bit connection of the bit-slice cell that multiplexer is included in, having a respective second input connection to said broadcast bit bus, and having a respective output connection selecting a bit applied to one of its first and second input connections in response to first control signal supplied via said shared control signal bus;

a respective clocked unit-delay element included in each of said n bit-slice cells between the output connection of its multiplexer and its own output connection;

means for clocking each of said clocked unit-delay elements at digit rate for said digit-serial input signal; and means for applying a broadcast bit signal to said broadcast bus.

19. A shifter as set forth in claim 18:

wherein said control signal bus is supplied control signal from the not-true output connection of said first flip-flop; and wherein said means for applying a broadcast bit signal to said broadcast bit bus essentially consists of a second flip-flop of D type included in said control cell, provided with a clock input connection to which said final-digit signal is applied, provided with a data input connection from the output connection of said multiplexer in said $n^{th}$ bit-slice cell, and provided with an output connection to said broadcast bit bus.

20. A shifter as set forth in claim 18:

wherein said control signal bus is supplied control signal from the true output connection of said first flip-flop; and wherein said means for applying a broadcast bit signal to said broadcast bit bus consists of means for applying a ZERO to said broadcast bit bus.

* * * * *